March 6, 1951     B. N. HILL ET AL     2,544,317
TREATMENT OF SYNTHETIC NAPHTHA
Filed Nov. 28, 1947
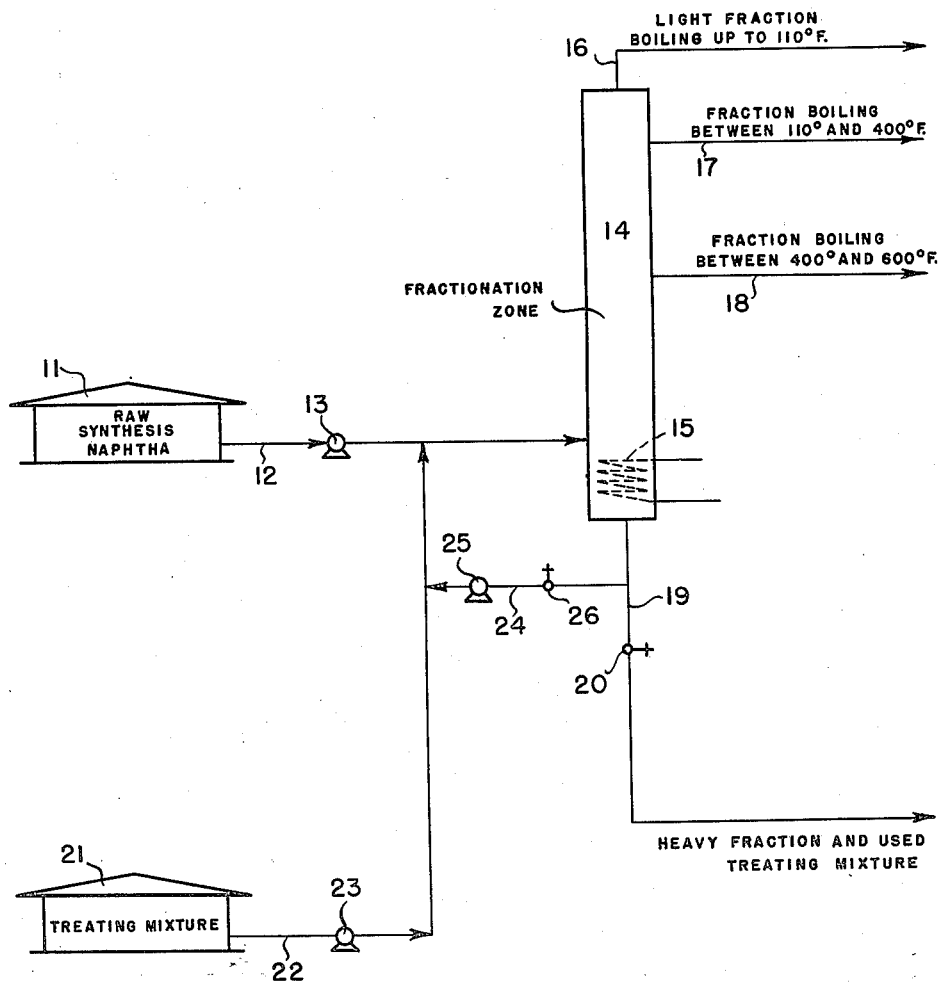
Boyd N. Hill
Edward F. Wadley, INVENTORS.
BY
J. B. McKean
ATTORNEY.

Patented Mar. 6, 1951

2,544,317

UNITED STATES PATENT OFFICE 2,544,317

TREATMENT OF SYNTHETIC NAPHTHA

Boyd N. Hill and Edward F. Wadley, Baytown, Tex., assignors, by mesne assignments, to Standard Oil Development Company, Elizabeth, N. J., a corporation of Delaware Application November 28, 1947, Serial No. 788,632

8 Claims. (Cl. 260—450)

The present invention is directed to a method and composition for removing oxygenated organic compounds from hydrocarbons containing them. More particularly, the invention is directed to the treatment of hydrocarbons obtained by reacting carbon monoxide and hydrogen in the presence of a catalyst.

The pioneering work by Fischer and Tropsch resulted in a process for producing hydrocarbons and oxygenated organic compounds from carbon monoxide and hydrogen by passing a mixture thereof over a suitable catalyst to cause a reaction between the materials. As a result of this work commercial processes have been developed to produce hydrocarbons and oxygenated organic compounds from carbon monoxide and hydrogen. The product from this synthesis reaction is a synthetic crude petroleum, but, unlike natural crude petroleum, it may contain a considerable quantity of oxygenated organic compounds such as ketones, aldehydes, organic acids, esters, and various other oxygenated hydrocarbon derivatives. These oxygenated organic compounds in themselves are valuable materials, but, in combination with hydrocarbons, they are objectionable since the hydrocarbons are contaminated by the oxygenated organic compounds and, therefore, are unsuitable for use in the various petroleum conversion processes where catalysts are employed.

The reason that the synthetic hydrocarbons produced by the reaction of carbon monoxide and hydrogen and contaminated with oxygenated organic compounds are unsuitable in catalytic conversion processes is that the oxygenated organic compounds react with the catalyst usually employed, such as the Friedel-Crafts type catalyst. Not only do the oxygenated organic compounds react with the catalyst but they enter into reaction with the hydrocarbons and produce products of less attractive nature than the product resulting from the catalytic conversion of the hydrocarbon themselves. For example, polymers having lubricating oil qualities may be produced by polymerizing alpha olefins in the presence of aluminum chloride, but, if these alpha olefins are contaminated with oxygenated organic compounds, as when produced from carbon monoxide and hydrogen, the product is not satisfactory in that the lubricating oil qualities are depreciated by the presence of the oxygenated organic compounds. Furthermore, the oxygenated organic compounds react with the catalyst and destroy its activity requiring considerably larger quantities of catalysts to cause the reaction to proceed than would be required if the oxygenated organic compounds were absent.

The problem of removing oxygenated organic compounds from naphthas formed by the reaction of carbon monoxide and hydrogen has long been recognized and numerous suggestions have been made for removing these compounds. The prior art proposals have included treatment of the naphthas with an adsorbent such as silica gel, solvent extraction with aqueous methanol, and various other solvents, such as sulfur dioxide and the like and mixtures thereof. It has also been suggested to remove a portion of the oxygenated organic compounds by treatment of the naphtha with various chemical reagents. The prior art proposals have largely been unsatisfactory in that, while they are effective in removing a portion of the oxygenated organic contaminants in the naphtha, they are largely ineffective in substantially completely removing the oxygenated organic compounds.

It has now been discovered that the oxygenated organic compounds contained in hydrocarbons may be substantially reduced in quantity by distilling the contaminated hydrocarbon containing these materials over a treating reagent comprising a mixture of alkali metal sulfonates, oil, and alkali metal hydroxide. This treatment serves to remove substantially all of the oxygenated organic compounds from the hydrocarbons, and it is particularly effective in removing ketones which usually resist most treating procedures.

It is, therefore, the main object of the present invention to provide a process for removing oxygenated organic compounds from naphthas containing them by distilling the naphtha in contact with a mixture of alkali metal sulfonates, oil, and alkali metal hydroxide.

Another object of the present invention is to provide a method for treating hydrocarbons containing oxygenated organic compounds as contaminants and olefins whereby the content of oxygenated organic compounds is substantially reduced and the hydrocarbons including the olefins are made suitable for employment in catalytic conversion operations.

A further object of the present invention is to disclose a process whereby a hydrocarbon mixture containing the various olefins and oxygenated organic compounds including ketones is treated such that the content of oxygenated organic compounds including ketones is substantially reduced and the olefin made suitable as a feed for producing synthetic lubricant polymers.

Still another object of the present invention is to provide a composition including an oil boiling in the lubricating oil boiling range, an alkali metal sulfonate, and an alkali metal hydroxide, which is suitable for use at an elevated temperature in treating hydrocarbon fractions contaminated with oxygenated organic compounds to remove contaminating oxygenated organic compounds therefrom.

The objects of the present invention are attained by subjecting hydrocarbons, such as a synthetic crude petroleum obtained by the reaction of carbon monoxide and hydrogen, to a distillation operation in the presence of a treating mixture including oil, an alkali metal sulfonate, and an alkali metal hydroxide under conditions to cause substantial removal of oxygenated organic compounds and to segregate fractions boiling in the gasoline and higher boiling ranges which are suitable for catalytic conversion operations.

The treating mixture employed in the present invention will usually comprise an oil boiling in the lubricating oil boiling range, an alkali metal sulfonate such as a sodium sulfonate produced by sulfonation of a solvent extract of a lubricating oil fraction and subsequent neutralization thereof, and an alkali metal hydroxide such as sodium hydroxide.

The alkali metal hydroxide is preferably sodium hydroxide, but potassium and lithium hydroxides may be substituted therefor.

The alkali metal sulfonate is preferably sodium sulfonates, but, like the alkali metal hydroxide, may be potassium sulfonate or lithium sulfonate and under some conditions ammonium sulfonates may be satisfactory.

The oil forming a portion of the treating mixture is preferably an oil boiling in the lubricating oil boiling range and may be a solvent extract of a lubricating oil fraction.

The sulfonates, as mentioned before, may be formed by sulfonation and subsequent neutralization of a solvent extract of a lubricating oil fraction, but may also be formed by sulfonation and subsequent neutralization of alkyl aromatics, which, in turn, may be produced by alkylation of aromatic hydrocarbons such as toluene and benzene with high molecular weight olefins having more than five carbon atoms in the side chain.

A satisfactory treating reagent may be obtained by treatment of a solvent extract such as a phenol extract of a lubricating oil fraction with strong sulfuric acid to cause sulfonation of the aromatic constituents contained therein followed by separation of the sludge and neutralization of the oil layer containing sulfonated derivatives with sodium hydroxide to form a mixture containing oil, sodium sulfonates, and a small amount of sodium hydroxide. To this mixture is added an amount of sodium hydroxide sufficient to provide an amount of sodium hydroxide between about 10 to 50 weight per cent of the mixture. While such a treating reagent may be formed by employing an excess of sodium hydroxide in the neutralization, it is to be understood that the treating reagent may be formed by compounding lubricating oil fractions, sodium sulfonates from any source, and sodium hydroxide.

The treating reagent, prior to the addition of the sodium hydroxide, should contain an amount of oil such as a lubricating oil fraction or a solvent extract of a lubricating oil fraction in the range from about 75% to 90% and the alkali metal sulfonate, such as sodium sulfonate, should be present in the mixture prior to the addition of the alkali metal hydroxide in an amount in the range between 10% and 25%. Such a mixture is readily formed by sulfonation of a solvent extract, such as a phenol extract, with strong sulfuric acid, followed by neutralization of the oily layer with sodium hydroxide. A base treating mixture which has given good results, after addition of sodium hydroxide, comprises about 90% unsulfonated phenol extract and about 10% sodium sulfonates.

The invention will now be illustrated by reference to the drawing in which the sole figure presents a flow sheet of a preferred mode of practicing the invention.

Referring now to the drawing, numeral 11 designates a charge tank containing a hydrocarbon fraction such as a raw synthesis naphtha obtained as the hydrocarbon product from the synthesis of carbon monoxide and hydrogen over an iron catalyst. This fraction is pumped into the system from tank 11 by line 12 and pump 13 which discharges the hydrocarbon feed into a fractionation zone 14. Fractionation zone 14 is provided with a heating means 15 which is illustrated by a coil. This heating means is employed to adjust temperatures and pressures in zone 14. Fractionation zone 14 is shown as a single distillation tower, but it is understood that it may include a series of fractional distillation towers. It is also understood that distillation zone 14 will be provided with internal baffling equipment, such as bell cap trays or other internal equipment, to provide intimate contact between vapors and liquids.

Fractionation zone 14 is also provided with a line 16 to remove light fractions boiling up to about 110° F., line 17 by way of which a fraction boiling between 110° and 400° F. may be obtained, line 18 for removal of a fraction boiling between 400° and 600° F., and line 19 controlled by valve 20 by way of which the heavy fractions and the treating mixture, which will be described further, may be withdrawn from the system.

The raw feed naphtha introduced into fractionation zone 14 by line 12 and pump 13 has admixed with it an amount of the treating mixture sufficient to react with the oxygenated organic compounds contained in the raw synthesis naphtha and to cause removal thereof. Usually raw synthesis naphthas, produced by the reaction of carbon monoxide and hydrogen over an iron catalyst will contain in the neighborhood of 20 weight percent of oxygenated organic compounds. To react with this content of oxygenated organic compounds, an amount of treating mixture in the range from about 5 to about 30 volume per cent may be employed. This will depend on the content of oxygenated organic compounds in the raw naphtha and this content will vary with the catalyst employed and the conversion conditions under which the naphtha is produced. The treating mixture is contained in tank 21 and is injected into the system by line 22 and pump 23 which allows the continuous injection of the treating mixture. The treating mixture in tank 21 will comprise a mixture of an oil such as a solvent extract of a lubricating oil, petroleum sodium sulfonates, and sodium hydroxide in the amounts given above.

The heavy fractions plus used treating mixture, withdrawn from fractionation zone 14 by line 19, may be recycled in part to line 22 by branch line 24 controlled by valve 26 and containing pump 25. Valve 23 may be adjusted to provide the proper ratio of the used treating mixture and the fresh treating mixture so that the oxygenated organic compounds may be removed from the raw naphtha with greatest efficiency.

The heavy fractions and used treating mixture not recycled in the process may be withdrawn from the system by manipulation of valve 20 in line 19. This fraction will contain useful hydrocarbons, oxygenated organic compounds dissolved in the treating reagent and the used treating reagent. To recover the valuable constituents contained therein, it may be desirable to dilute this fraction after cooling in suitable cooling means, not shown, with water or an aqueous solution to cause the formation of a hydrocarbon layer and an aqueous layer. The hydrocarbon layer and the aqueous layer are separable by gravity from each other. The hydrocarbon layer may be further used if desired while a substantial amount of the oxygenated organic compounds containing the aqueous layer may be recovered therefrom by acidification with a mineral acid.

It will be seen from the foregoing description that a simple distillation process including a treating operation has been described wherein a contaminated hydrocarbon containing oxygenated organic compounds is subjected to distillation in the presence of a treating reatgent comprising oil, alkali metal sulfonates, and alkali metal hydroxide to obtain an overhead fraction, substantially free of contaminants, which is useful in catalytic conversion operations.

The invention will now be further illustrated by specific runs in which a naphtha formed by the reaction of carbon monoxide and hydrogen over an iron-type catalyst was divided into five portions. One portion was subjected to distillation as is to recover fractions boiling between 110° and 400° F. and between 400° and 600° F. A second portion was treated with sodium hydroxide solution in an amount of 50 volume per cent. The sodium hydroxide solution had a strength of 5° Bé. The second portion, after separation from the caustic solution, was subjected to distillation conditions under comparable conditions to those used for the first portion to obtain fractions boiling between 110° and 400° F. and between 400° and 600° F.

The third portion was treated in accordance with the present invention in that it had added to it an admixture containing oil and sodium sulfonates to which had been added about 40 weight per cent sodium hydroxide. Ten volumes of this mixture was added to the naphtha and the naphtha distilled under conditions comparable to those used in the other runs to obtain fractions having similar boiling ranges. The fourth portion was distilled over a mixture of oil and sodium sulfonate to which no sodium hydroxide had been added. In this instance, 10 volumes of the mixture substantially free of sodium hydroxide was employed. Fractions having boiling ranges similar to those mentioned above were obtained.

In the fifth and final run on the fifth portion of naphtha, the naphtha was distilled over 33 volume per cent of a solution of 50° Bé. sodium hydroxide to obtain a single fraction boiling between 110° and 400° F.

The fractions having the aforementioned boiling ranges were subjected to analysis for oxygenated organic compounds with the results reported in the following table:

Table

| Treatment | None | | Washed with NaOH and then distilled | | Distilled over mixture of oil, petroleum sodium sulfonates and NaOH | | Distilled over mixture of oil and petroleum sod. sulfonates | | Distilled over 50° Be. NaOH |
|---|---|---|---|---|---|---|---|---|---|
| Boiling range, °F | 110-400 | 400-600 | 110-400 | 400-600 | 110-400 | 400-600 | 110-400 | 110-400 | 110-400 |
| Analysis: Oxygenated Organic Compounds, weight per cent (expressed as functional group)— | | | | | | | | | |
| OH (alcohols) | 0.93 | 0.27 | 0.40 | 0.50 | 0.87 | 0.10 | 0.70 | 0.00 | 1.12 |
| CHO (aldehydes) | 0.62 | 0.15 | 0.82 | 0.33 | 0.00 | 0.10 | 0.30 | 0.30 | 0.00 |
| COOH (acids) | 0.92 | 0.47 | 0.00 | 0.00 | 0.00 | 0.00 | 0.50 | 0.30 | 0.00 |
| COO (esters) | 0.64 | 3.38 | 0.39 | 0.31 | 0.00 | 0.00 | 0.70 | 1.35 | 0.00 |
| CO (ketones) | 1.13 | 0.27 | 1.33 | 0.91 | 0.13 | 0.20 | 1.10 | 0.10 | 0.55 |

It will be apparent from the foregoing data that the fractions boiling between 110° and 400° F. and 400° and 600° F. obtained by distillation without any treatment of the naphtha contained considerable amounts of the several oxygenated organic compounds. Treatment of the naphtha prior to distillation with the sodium hydroxide solution served to reduce the content of alcohols, increase the content of aldehydes, remove substantially the organic acids, and reduce the amount of esters, but resulted in increased amounts of ketones. The fractions obtained by distillation over a mixture of oil and sodium sulfonates and over the 50° Bé. sodium hydroxide, respectively, contained appreciable quantities of alcohols, aldehydes, acids, esters, and ketones.

Comparing these four runs with the run in accordance with the present invention, it will be noted that the present invention allows a substantial reduction in the aldehyde, acid, ester, and ketone content of the contaminated naphtha. The lighter fraction obtained in accordance with the present invention had a high content of alcohols but this is no particular problem since the alcohol may be removed by well-known procedures. The ketones especially resist conventional methods of removal and the beneficial aspects of the present invention in this respect should be emphasized. Attention is also directed to the fact that neither the strong sodium hydroxide solutions nor the mixture of oil and sodium sulfonates were as effective as the mixture of the two employed as the treating reagent in accordance with the present invention.

It is not understood why a mixture of oil, alkali metal sulfonates, and alkali metal hydroxide gives better results than the components of the mixture taken alone, but it is theorized as one explanation of the beneficial results that, since the alkali metal sulfonates are miscible with the contaminated hydrocarbons containing oxygenated organic compounds in substantially all proportions, their principal function is to serve as a carrier for the alkali metal hydroxides. The function of the high boiling lubricating oil fraction is to fluidize the mixture and make it available for contact with the contaminated hydrocarbon fraction allowing substantially complete removal of the deleterious oxygenated organic compounds. It is to be understood, of course, that this explanation of the beneficial aspects of the present invention is given solely for illustration purposes and for a better understanding of the invention, and it is not to be construed as limiting our invention in any manner whatsoever.

The nature and objects of the present invention, having been fully described and illustrated, what we wish to claim as new and useful and to secure by Letters Patent is:

1. A method for removing oxygenated organic compounds including ketones, aldehydes and esters from a synthetic crude petroleum containing them in substantial quantities which comprises subjecting the synthetic crude petroleum containing the oxygenated compounds to distillation in the presence of a treating reagent comprising a hydrocarbon fraction boiling in the lubricating oil boiling range, an alkali metal sulfonate, and an alkali metal hydroxide and recovering a distillate fraction having a boiling point no greater than 600° F. which is substantially free of oxygenated organic compounds.

2. A method for removing oxygenated organic compounds including ketones, aldehydes and esters from a synthetic crude petroleum containing them in substantial quantities which comprises forming a mixture of the synthetic crude petroleum containing the oxygenated organic compounds and a treating reagent comprising a hydrocarbon fraction boiling in the lubricating oil boiling range, an alkali metal sulfonate, and an alkali metal hydroxide, subjecting the admixture to conditions of distillation at an elevated temperature, and recovering a fraction boiling in the gasoline boiling range which is substantially free of oxygenated organic compounds.

3. A method in accordance with claim 2 in which the hydrocarbon fraction is admixed with an amount of the treating reagent in the range from about 5 to about 30 volume per cent.

4. A method in accordance with claim 2 in which the fraction boiling in the lubricating oil boiling range is a solvent extract of a lubricating oil fraction, the alkali metal sulfonate is sodium sulfonate, and the alkali metal hydroxide is sodium hydroxide.

5. A method for removing oxygenated organic compounds including ketones, aldehydes and esters from a hydrocarbon fraction obtained from the synthesis of carbon monoxide and hydrogen over an iron catalyst which comprises admixing the hydrocarbon fraction from the the synthesis of carbon monoxide and hydrogen over an iron catalyst with a treating reagent comprising a hydrocarbon fraction boiling in the lubricating oil boiling range, an alkali metal sulfonate, and an alkali metal hydroxide, subjecting the admixture to distillation conditions and recovering from said distillation a fraction boiling in the gasoline boiling range substantially free of oxygenated organic compounds.

6. A method in accordance with claim 5 in which the hydrocarbon fraction is admixed with an amount of the treating reagent in the range from about 5 to about 30 volume per cent.

7. A method in accordance with claim 5 in which the fraction boiling in the lubricating oil boiling range is a solvent extract of a lubricating oil fraction, the alkali metal sulfonate is sodium sulfonate, and the alkali metal hydroxide is sodium hydroxide.

8. A method for removing oxygenated organic compounds including ketones, aldehydes and esters from the hydrocarbon fraction containing them which comprises subjecting the hydrocarbon fraction containing the oxygenated organic compounds to distillation in the presence of a treating reagent comprising 75% to 90% of a hydrocarbon fraction boiling in the lubricating oil boiling range, 10% to 25% of an alkali metal sulfonate to which has been added an amount of an alkali metal hydroxide sufficient to provide an amount of alkali metal hydroxide in said treating reagent in the range between 10% and 50%.

BOYD N. HILL.
EDWARD F. WADLEY.

REFERENCES CITED

The following references are of record in the file of this patent:

UNITED STATES PATENTS

| Number | Name | Date |
|---|---|---|
| 1,233,700 | Petroff | July 17, 1917 |